Nov. 24, 1931. A. C. DAHL 1,833,636
ARTICLE CONVEYING SYSTEM
Filed March 31, 1928 2 Sheets-Sheet 2
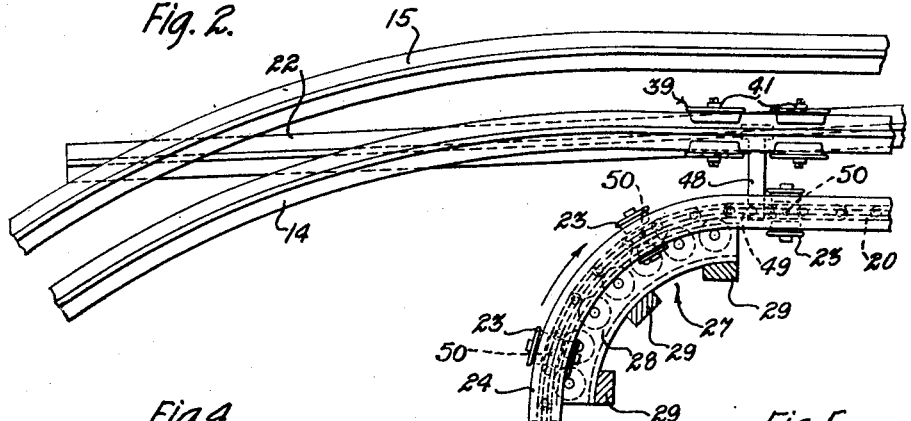
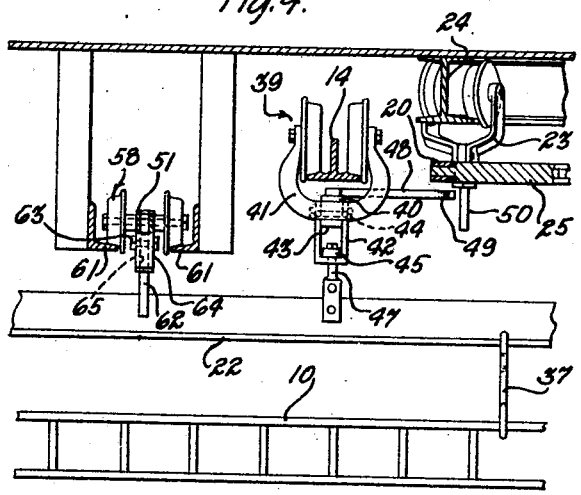
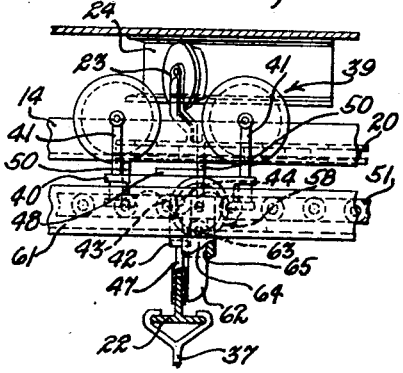
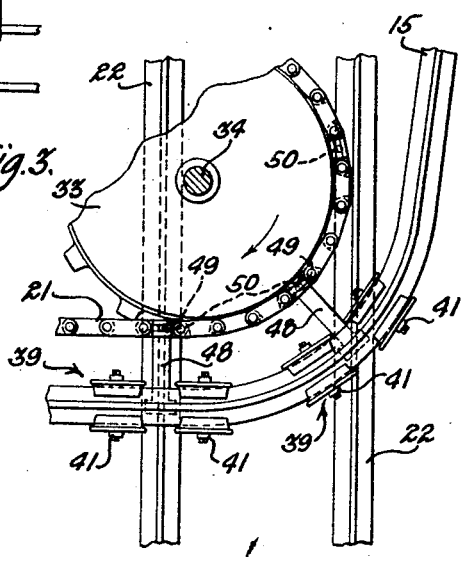
Inventor
Arthur C. Dahl
by H. A. Satterwhite Atty.

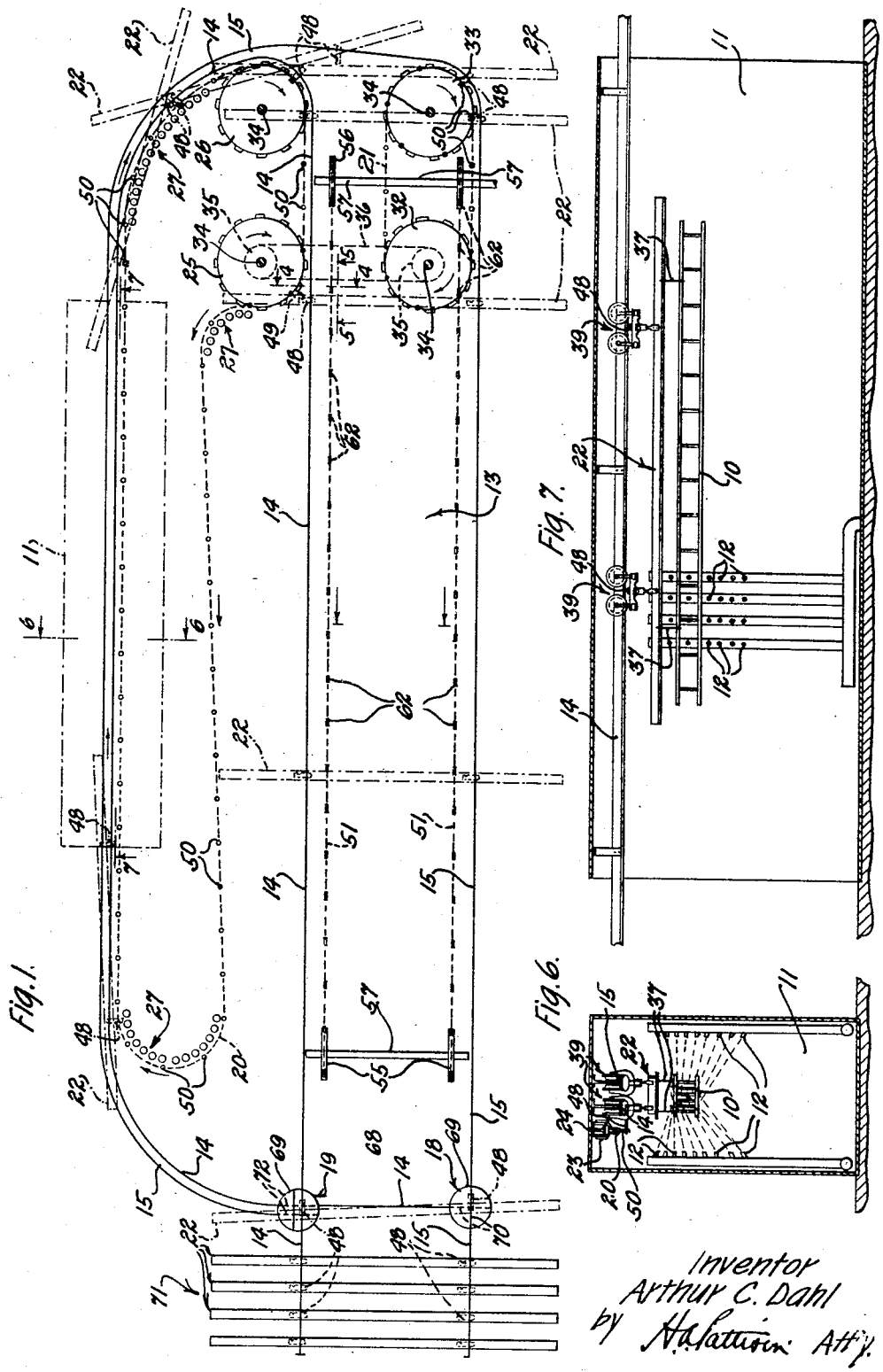

Patented Nov. 24, 1931

1,833,636

UNITED STATES PATENT OFFICE

ARTHUR CLARENCE DAHL, OF HINSDALE, ILLINOIS, ASSIGNOR TO WESTERN ELECTRIC COMPANY, INCORPORATED, OF NEW YORK, N. Y., A CORPORATION OF NEW YORK

ARTICLE CONVEYING SYSTEM

Application filed March 31, 1928. Serial No. 266,150.

This invention relates to article conveying systems, and more particularly to a continuous conveying system for progressively passing articles through treating zones.

The primary object of this invention is to provide a system for efficiently and expeditiously conveying articles successively through treating zones occupying a minimum of space.

In accordance with one embodiment of this invention as used in connection with an apparatus for spraying paint on comparatively long articles, such as telephone switchboard frames, there is provided a conveying system having a plurality of continuously driven endless conveyors arranged to successively and continuously advance carriers holding the articles through a spraying zone in a direction substantially parallel to their length at a certain speed and thence along a drying zone at a reduced speed in a direction opposite to their advance through the spraying zone and at right angles to their length, the advance of the articles throughout the system being in a constant plane and toward an unloading and loading position. Suitable cross-over mechanism is provided for diverting article carriers from the loading and unloading position direct to the spraying zone or to an idle carrier zone.

Other objects and advantages of this invention will more clearly appear from the following detailed description taken in connection with the accompanying drawings, in which Fig. 1 is a diagrammatic plan representation of an article conveying system according to this invention as used in connection with the spraying and drying of articles;

Figs. 2 and 3 are enlarged fragmentary detail views, partly in section, of portions thereof at the upper left and lower right corners, respectively;

Figs. 4 and 5 are enlarged detail vertical sections on the lines 4—4 and 5—5, respectively, of Fig. 1, and Figs. 6 and 7 are enlarged vertical sections on the lines 6—6 and 7—7, respectively, of Fig. 1.

Referring now to the drawings in which like reference numerals designate similar parts throughout the several views, the features of this invention have been shown embodied in a system and apparatus for conveying rectangular shaped articles, such as telephone switchboard frames 10, which are quite long compared to their width, longitudinally through a spraying zone or booth 11, which is indicated in dotted outline in Fig. 1, where they may receive a coating of paint from a plurality of nozzles 12 (Figs. 6 and 7) supplied from a source (not shown) and thence through a drying zone 13 (Fig. 1).

The supporting framework or structure for the conveying system is not entirely shown for it is not believed necessary to a complete understanding of this invention. It will be sufficient, it is believed, to mention that the framework comprises suitable upright beams resting on the floor with horizontal connecting girders and other lesser supports, and a plurality of brackets and bearings distributed throughout the structure for supporting different elements of the conveying system.

At a suitable height above the floor a pair of rails 14 and 15 having a T-shape cross-section is supported. The rail 14 commences at a rotary cross-over or switch mechanism 18 of a usual type at the lower left corner of the system as illustrated in Fig. 1 and extends into another rotary switch mechanism 19, at which point the rail 15 commences. The switch mechanisms 18 and 19 will be described hereinafter. The two rails 14 and 15 lie comparatively close and in parallelism at the switch 19 and commencing at this point they curve to the right in the same relationship and in a straight run extend through the painting booth 11, thence curve inwardly, the rail 14 curving sharply to the left away from the rail 15 and terminating on a line which forms a straight run to the switch mechanism 19, and parallel to its run through the booth 11 and at right angles to the vertical axis of the mechanism 19. The rail 15 continues in a comparatively short straight run from the point where the rail 14 diverges therefrom and slightly inward and thence curves sharply to the left and terminates on a line which forms a straight run, which lies parallel to the last mentioned run of the rail 14, to the switch mechanism 18 and at right angles to the vertical axis thereof. The spacing of the rails 14 and 15 along the straight runs, which extend from right to left and into the switching mechanisms 18 and 19, it will be observed, are far apart as compared to their spacing as first described at the point where the rails lie close together at the switching mechanism 19.

Endless conveyor chains 20 and 21 having certain sections thereof lying close and in parallelism to the rails 14 and 15 along predetermined sections thereof serve to propel carriers 22, which carry the frames 10 through the painting booth 11 and the drying zone 13. The chain 20 is supported vertically by trolleys 23 (Figs. 2 and 4) secured to certain of the chain links at predetermined intervals and riding on an I rail 24 disposed directly above the chain 20 throughout its length and is guided laterally by chain wheels 25 and 26 and by groups of rollers 27 at turns. Each group of rollers 27 is similar, except for the number of rollers in each group, and the radius in which they are arranged (Figs. 1 and 2) and as shown in detail in Fig. 2, are carried in a bearing member 28 attached to brackets 29 which are suitably supported from the main framework (not shown). The chain 21 is entirely supported by sprocket wheels 32 and 33 and it will be understood that the sprocket wheels 25, 26, 32 and 33 and their shafts 34 are supported in a suitable manner from the main framework. The shaft 34 of the wheel 32 is driven at a predetermined speed from a source of power (not shown) and through a set of similar wheels 35 and an interconnecting chain 36 is connected to the shaft 34 of the wheel 25; thus it will be apparent that the chains 20 and 21 are driven at the same speed in a common direction as indicated by the arrows (Fig. 1).

Referring particularly to Figs. 2, 4, 5, 6 and 7 the carriers 22 each comprise a T-bar of a length which is substantially the length of the frame 10 to be conveyed and which is suspended from the carrier by a plurality of hooks 37, each of the carriers being suspended from the rails 14 and 15 by a pair of trolleys 39, a trolley being arranged adjacent each end of the carrier. Each of the trolleys 39 and the means for supporting the carriers therefrom (Figs. 2 and 4) are identical so that a description of a trolley at one end of the carrier will suffice. Referring particularly to Figs. 4 and 5 upon a trolley frame or bar 40 which is provided with bifurcated ends there is pivoted a pair of wheel yokes 41, each supporting at their upper opposed ends a pair of wheels arranged to roll upon the oppositely disposed lower flanges of either of the T-shaped rails 14 and 15. Intermediate the bifurcated ends of the trolley frame 40 is a U-shaped bracket 42 having its parallel arms secured to an apertured lug 43, formed upon the underside of the frame 40, by a bolt 44. Pivotally supported upon a thrust ball bearing 45 resting upon the upper surface of the arm connecting the parallel arms of the bracket 42 is a depending link 47 which is secured at its lower end to the central arm of the T-bar carrier 22. With this construction of the trolleys 39 wherein the wheel yokes 41 thereof are each independently pivoted upon the frame 40 and with the trolley 39 rotatably attached to the carrier bar 22 it will be apparent that the carrier 22 with its load will be conveyed along the rails 14 and 15 and around the curves thereof very readily and smoothly.

Secured to and extending laterally from the top surface of each of the trolley frames 40 intermediate the bifurcated ends thereof is a finger 48 provided at its free end with a hook 49. Certain of the links of each of the chains 20 and 21 at predetermined intervals are provided with depending fingers 50 which are circular in cross-section and project into the path of the hooked ends 49 of the laterally extending fingers 48 of the trolleys 39 under certain conditions which will be referred to in the description of operation of the system. Arranged between the two straight runs of the rails 14 and 15, which runs extend from the switch mechanisms 18 and 19 to a point intermediate the chain wheels 25 and 26, and along which the drying zone 13 occurs, is a pair of endless conveyor chains 51 which extend around chain wheels 55 and 56 attached to shafts 57 suitably supported from the main framework, the shaft carrying the wheels 56 receiving motion from a suitable source of power (not shown) for driving the chains 51 at a predetermined speed in the direction indicated by the arrows (Fig. 1). The speed of the chain 51 is considerably less than the speed of the chains 20 and 21, since the purpose of the chains 51, is to convey the painted articles through the drying zone 13 at a considerably slower speed. The chains 51 are supported vertically between the wheels 55 and 56 by trolleys 58 secured to certain of the chain links at predetermined intervals which roll upon a pair of angle iron rails 61 paralleling each side of each of the endless chains (Fig. 4). Also carried by certain of the links of the chains 51 at predetermined intervals are pivotal depending fingers 62 (Figs. 1, 4 and 5), the spacing of the fingers being identical on each of the chains 51 and disposed oppositely on each of the chains and are also spaced similarly to the fingers 50 on the chains 20 and 21.

As clearly shown in Figs. 4 and 5 the fingers 62 are each pivoted upon a bolt 63 which extends through a bracket 64 attached to the chain link. The bracket 64 has been partly broken away, as shown in Fig. 5, to disclose a wall 65 at one side, the opposite side being open. It will be clearly apparent that the fingers 62 may be rotated clockwise about the bolts 63, but are prevented by the wall 65 from rotating counterclockwise. This permits the carriers 22 to be moved through the drying zone 13 at a greater speed than that caused by the advancing fingers 62 in case it is desired to do so, since the fingers will yield in the direction of their advance as indicated by the arrow in Fig. 1. After the carriers 22 have been advanced to the left as far as the fingers 62 will carry them they are in an unloading and loading zone 68, although, if necessary, they may be unloaded and loaded before reaching this zone if the articles are dried sufficiently, since the movement of the carriers is very slow. Upon unloading and reloading the carriers 22, or in the case that the frames are to be treated a second time by being advanced through the booth 11, the carriers are manually advanced along the rails 14 and 15 to the switch mechanisms 18 and 19 and associated with the sections of the rails extending at right angles to the sections thereof extending through the drying zone and then may be advanced toward the conveying chain 20 which, as will be shortly described, carries them through the painting booth 11.

The rotary cross-over or switch mechanism 18 (Fig. 1) comprises a suitably supported circular rotary member 69 carrying a single length of rail 70 which may be alined at one end, as shown in full lines, with the rail 15 at the unloading and loading zone 68 and its other end with a section of the rail 15 in an idle carrier zone 71, or it may be turned at right angles thereof, as shown in dotted lines, and alined with the end of the rail 14 extending between the switching mechanisms 18 and 19.

The switch mechanism 19 is similar to the mechanism 18 just described but is provided with two parallel lengths of rails 72 for accommodating two rails. The rails 72 are spaced for alinement with the parallel closely arranged rails 14 and 15 leading to the painting booth 11, when in the position shown in dotted lines in Fig. 1, and when turned at right angles thereto serve to connect the rail 14 at the unloading and loading zone 68 with a section of the rail 14 in the idle carrier zone 71, as shown in full lines, the lower length of rail 72, as viewed in Fig. 1, forming the connecting link between these two sections of the rail 14, the other rail length 72 being idle at this time.

The operation of the article conveying system hereinbefore described is as follows: The carriers 22 are each loaded with a frame 10 either in the unloading and loading zone 68, as hereinbefore mentioned, or in the idle carrier zone 71 in case additional carriers are needed in the system. In either case the rotary switching mechanisms 18 and 19 are positioned as shown in full lines in Fig. 1, with the rail lengths 70 and 72 forming a connecting link between the rails 14 and 15 at either side of the switch mechanisms.

The carrier 22 having a frame 10 suspended therefrom in the manner hereinbefore described is manually advanced from either side of the switch mechanisms until the trolleys 39 at either end of the carrier T-bar are centered upon the rail lengths 70 and 72. The members 69 are then rotated clockwise for 90° to position the rail lengths 70 and 72 fixed thereto in the position indicated by dotted lines in Fig. 1, during which movement it will be apparent that the carrier trolleys 39, due to their pivotal attachment to the carrier T-bar, will also move therewith, the T-bar remaining substantially in the same position, except as will be mentioned shortly. In rotating the switch mechanism 19 in the manner just described the rail length 72 previously connecting the rail lengths 14 at either side of the switch mechanism will be alined with the rail 15, and its companion rail length 72 previously idle will form a connecting link between the rail lengths 14 arranged at right angles to the before mentioned rail lengths 14, thus one trolley 39 of the carrier 22 will be alined with the rail 15. The rotation of the switching mechanism 18 to position the rail length 70 in its dotted line position (Fig. 1) it will be apparent alines the other trolley 39 of the carrier 22 with the rail 14. With one trolley 39 on the rail 15 and the other on the rail 14 the T-bar of the carrier 22 will assume the slight angular position shown in dotted outlines (Fig. 1) due to one of the trolleys 39 being on either rail.

In this position of the trolleys 39 the loaded carrier is manually advanced around the closely spaced and parallel curved rails 14 and 15 leading to the painting booth 11 until the carrier is positioned along the straight runs of the rails and in such a position that the finger 48 extending laterally from the rear trolley 39 upon the rail 14 lies in the path of the oncoming depending finger 50 of the chain 20 which has been set in motion together with the chains 21 and 51. The space between the rails 14 and 15 along this portion of the system is such that the finger 48 on the forward trolley 39 of the carrier 22 will not be engaged by the fingers 50 of the chain 20. Upon the advancing finger 50 engaging the hooked end 49 of the finger 48 projecting into its path the frame 10 will be advanced through the booth 11 at a predetermined speed in a direction substantially parallel to its length and during its passage therethrough will be given a complete coating of paint from the nozzles 12.

As the carrier 22 emerges from the right end of the booth 11 (Fig. 1) it will be turned at an angle to its direction of advance through the booth and finally into a position where it is positioned at right angles thereto. The finger 50 on the chain 20 cooperating with the finger 48 of the single trolley 29 serves alone to advance the carrier 22 to the latter mentioned position, whereupon a finger 50 on the chain 21 which is operating at the same speed as the chain 20 comes into engagement with the hooked end 49 of the finger 48 on the other trolley 39, at the opposite end of the carrier, which is rolling along the rail 15 which has diverged from the rail 14, the finger having been idle up to this time and thereafter both ends of the carrier 22 are advanced in unison in a direction opposite to the advance of the carrier through the painting zone and at right angles to the length of the frame 10 toward the drying zone 13. As the chains 20 and 21 are guided by the wheels 25 and 32 away from the rails 14 and 15, respectively, the fingers 50 on these chains are disengaged from the fingers 48 of the carriers 22. The finger 50 on the chain 20 traveling away from the finger 48 of one of the trolleys 39 is clearly indicated in detail in Fig. 4.

In timed relation to the disengagement of the conveyor chains 20 and 21 from opposite ends of the carrier 22 the depending pivotal fingers 62 of the slow speed conveyor chains 51 engage the vertical arm of the carrier T-bar as clearly shown in Figs. 4 and 5 and continue the advance of the frame 10 through the drying zone 13. The disengagement of the chains 20 and 21 from the carrier 22 and the engagement of the chains 51 therewith occurs without any appreciable interval of time. As hereinbefore described the carriers 22 may be unloaded and reloaded before reaching the zone 68 and while still being conveyed by the chains 51 depending upon the condition of the frames 10 or other articles as they move through the drying zone 13 and also upon the amount of work being conveyed through the system. The carriers 22 upon being reloaded to be conveyed through the system again or in case it is desired to advance them to the idle carrier zone 71 are switched accordingly by the switching mechanisms 18 and 19 as hereinbefore described.

It will be evident from the description of the continuous conveying system hereinbefore described wherein the articles after being painted or otherwise treated are turned at right angles to their direction of advance through the treating zone and then advanced at a reduced speed through a second zone for drying them in a direction opposite to their advance through the first zone and at right angles to their length that the amount of space necessary through which the articles need to travel to complete their drying or other treatment will be materially reduced. Also the space necessary to complete the several treatments may be accomplished in a space combining minimum length and width.

Although this invention has herein been disclosed and described in the form of a particular arrangement for the handling of elongated articles to be treated having considerably greater length than width, it is clear that it may have a more general application and that modifications can be made without departing from the spirit and scope of the appended claims.

What is claimed is:

1. In a system for conveying articles to be treated, movable carriers for advancing articles through a treating zone and into another zone, guide means for causing the carriers and the articles advanced thereby to be conveyed in a single horizontal plane and responsive to the advance of the articles through a predetermined distance for causing the articles in their advance from one zone to the other to be turned at an angle to their direction of advance in the first zone, and additional means for advancing the articles so turned through the second zone in a direction opposite to their direction of advance in the first zone and at a different speed.

2. In a continuous system for conveying elongated articles to be treated, movable carriers for advancing articles through a treating zone at a predetermined speed in a direction substantially parallel to their length and into another zone, guide means for causing the carriers and the articles advanced thereby to be conveyed in a single horizontal plane and responsive to the advance of the articles through a predetermined distance for causing the articles in their advance from one zone to the other to be turned at an angle to their direction of advance in the first zone, and additional means for advancing the articles so turned through the second zone in a direction opposite to their direction of advance in the first zone and at a different speed.

3. In a continuous system for conveying elongated articles to be treated, movable carriers for the articles, guide means for causing the carriers and the articles advanced thereby to be conveyed in a single horizontal plane, means for advancing the carriers along the guide means through a treating zone at a predetermined speed in a direction substantially parallel to the length of the articles and into another zone, the guide means causing the articles in their advance from one zone to the other to be turned at an angle to their direction of advance in the first zone, and additional means for advancing the articles so turned through the second zone in a direction opposite to their direction of advance in the first zone and at a different speed.

4. In a continuous system for conveying elongated articles to be treated, movable roller carriers for the articles, a pair of elevated guide rails from each of which one end of the carriers is roller suspended, the guide rails being disposed adjacent each other along one portion of the system for guiding the articles in a direction substantially parallel to their length through a treating zone and into another zone at an angle to their direction of advance in the first zone, the rails then diverging to provide a comparatively wide spacing therebetween and in parallelism for guiding the articles through the second zone in a direction opposite to their direction of advance in the first zone and at right angles to their length, and means for advancing the carriers through the several zones at predetermined different speeds.

5. In a continuous system for conveying elongated articles to be treated, movable carriers for the articles, guide means for the carriers, endless traveling means having projections arranged to engage rear portions of successive carriers for advancing them along the guide means through a treating zone at a predetermined speed in a direction substantially parallel to their length and into another zone, the guide means causing the carriers in their advance from one zone to the other to be turned at an angle to their direction of travel in the first zone, another endless traveling means having projections arranged to engage the forward end of successive carriers during their turning movement, the two endless means acting in timed relation to advance the carriers for a predetermined distance through the second zone in a direction opposite to their direction of advance in the first zone and at right angles to their length, and additional means for completing the advance of the carriers through the second zone at a different speed.

6. In a continuous system for conveying elongated articles to be treated, movable roller carriers for the articles, a pair of guide rails from each of which one end of the carriers is roller suspended, the guide rails being disposed adjacent each other along a treating zone portion of the system beginning at one end where the adjacent rails are arranged at right angles to another portion of the system where the rails are spaced comparatively far apart, the other end of the adjacently arranged rails diverging and meeting the other end of the rails which are spaced far apart, at which point another zone commences, and means for advancing the carriers with the articles through the several zones at predetermined different speeds first in a direction substantially parallel to their length and then in a direction opposite to their direction of advance in the first zone and at right angles to their length.

7. In a continuous system for conveying elongated articles to be treated, movable carriers for the articles, rails for the carriers, means for advancing the carriers along the rails through a treating zone at a predetermined speed in a direction substantially parallel to the length of the articles and into another zone, the rails guiding the articles in their advance from one zone to the other in a direction at an angle to their direction of advance in the first zone, additional means for advancing the articles so guided along the rails through the second zone in a direction opposite to their direction of advance in the first zone and at a different speed to a loading and unloading zone, the rails providing at a point intermediate the treating and loading zones an idle carrier zone, and cross-over mechanism operatively associated with the rails for diverting article carriers from the loading to the treating zone or to the idle zone.

8. In a continuous system for conveying elongated articles to be treated, movable carriers for the articles, means for advancing the carriers through a treating zone at a predetermined speed in a direction substantially parallel to their length and into another zone, means cooperating with the carrier advancing means for causing the articles carried by the carriers in their advance from one zone to the other to be directed at an angle to their direction of advance in the first zone, and traveling means supporting depending pivotal fingers arranged to engage successive carriers for completing the advance of the articles so turned through the second zone in a direction opposite to their direction of advance in the first zone and at a reduced speed, the pivotal fingers yieldable in the direction of their advance for permitting the carriers to be moved through the last zone at a speed different than that of the traveling article advancing means.

In witness whereof, I hereunto subscribe my name this 21st day of March, A. D. 1928.

ARTHUR CLARENCE DAHL.